PRIOR ART   PRIOR ART

INVENTORS
W. P. BRAUNS
G. E. HARTRANFT

BY Don P. Bush
ATTORNEY

FIG-6

United States Patent Office 3,487,540
Patented Jan. 6, 1970

3,487,540
METHODS OF AND APPARATUS FOR PRODUCING MULTICONDUCTOR TRANSMISSION MEDIA HAVING IMPROVED CAPACITIVE CHARACTERISTICS
William P. Brauns, Severna Park, and George E. Hartranft, Parkville, Md., assignors to Western Electric Company, Incorporated, New York, N.Y., a corporation of New York
Filed May 15, 1967, Ser. No. 638,488
Int. Cl. H01b *13/06*
U.S. Cl. 29—624                                      11 Claims

ABSTRACT OF THE DISCLOSURE

In order to reduce the undesirable electrical effects of insulation which is inherently eccentrically applied to individual conductors, on the spacing between conductors when they are stranded into a multiconductor communications wire or cable, means and methods have been provided to distribute the inherent eccentricity of the insulation around the axis of the individual conductors by twisting the individual conductors about their own axes with different lengths of twist so that, when the conductors are stranded together to form a communications wire or cable, occurrence of periodic matching of eccentricity of the insulation on the adjacent stranded conductors of the wire or cable is reduced and the spacing between the conductors is more nearly equalized thereby reducing the electrical unbalance and resultant electrical effect commonly known as "crosstalk."

BACKGROUND OF THE INVENTION

Field of the invention

The invention relates to methods of and apparatus for pretwisting individual insulated conductors of a plural conductor wire or cable with different twist lengths to improve the electrical properties thereof.

Description of the prior art

In telephone installations, an increasing amount of use is being made of multiservice handsets which require more than a single pair of conductors to connect the handsets to a terminal point. Residence-type telephone handsets with services such as lighted dials are connected with four-conductor station wires. Also, in commercial and industrial installations, central terminal points are connected to handsets with station wires and very often, it is convenient to use four-conductor station wires. Because a majority of station wires installed today are used in applications like the ones described above, and because it is economical to reduce the number of types of station wires used, craftsmen installing telephone systems have begun the practice of installing four-conductor station wires in many applications where two or three-conductor wires would ordinarily suffice. The substantial use of four-conductor station wire has created an atmosphere where improvements in quality and cost of four-conductor station wires can be very profitably pursued. Some improvements to four-conductor station wires are described in a pending application, Ser. No. 613,188, filed on Feb. 1, 1967, now Patent No. 3,433,884, in the names of N. J. Cogelia, S. M. Martin and R. B. Ramsey.

The use of four-conductor wires leads to situations where two talking circuits are handled on the same station wire; and in the case of telephone sets with lighted dials, a talking circuit and a 60-cycle lighting circuit are contained in the same station wire. The use of two talking circuits or one talking circuit and a 60-cycle lighting circuit in close proximity gives rise to a well-known problem of the telephone industry known as crosstalk. Crosstalk develops when a first circuit induces a disturbing signal in conductors of nearby circuits, which, of course, become disturbed circuits. An induced signal in the disturbed pair occurs when the electric or magnetic fields generated by one of the conductors of the disturbing pair creates a current in one of the conductors of the disturbed pair, and this induced current is not precisely opposed by an induced current in the other conductor of the disturbed pair. The net induced current so obtained is heard by the telephone subscriber as crosstalk or noise.

One way of eliminating or at least significantly reducing the net induced currents in a four conductor station wire is to place the conductors in a star quad configuration, wherein the four conductors of two paired circuits are placed in the corners of an imaginary square; and diagonally disposed conductors are used as the components of paired circuits. When the spacing between conductors of a star quad is exactly equal and the dielectric material therebetween is distributed uniformly, the currents induced in the two conductors of the disturbed pair will be equal and opposite, thus a state of electrical balance is more nearly achieved. Any inequality in spacing contributes to creating electrical unbalance.

A star quad structure is commonly used in station wire today. Previously designed star quads were adequate to create satisfactory electrically balanced circuits over short distances. In more recent times as longer and longer distances are required to be spanned by such station wires, cross splices were made in the station wire at intervals of approximately 100 feet in order to help attain electrical balance. The cross splicing of such wires is obviously time consuming and expensive; and in some cases, lengths of over 100 feet were required in locations not readily accessible for splicing.

In order to overcome these difficulties, it was desirable to provide for more uniform spacing between conductors in order that longer lengths of station wire could be used without cross splicing. However, obvious limitations existed with respect to methods and apparatus with which the uniform spacing could be accomplished economically. One of these limitations related to the methods and apparatus used for forming plastic insulation on the individual conductors of the station wire. The plastic insulation of each conductor of a station wire is applied separately by an extrusion operation. Due to the characteristics of particular extruders, the insulation applied to any conductor is often eccentric to a certain extent. In other words, no matter how well the extruder is adjusted, the insulation will probably be thicker on one side of the wire than on the other. This almost inevitable eccentricity results in unequal spacing between insulated conductors and consequently the mutual capacitance of the different pairs of conductors will vary and other electrical unbalances will develop when the insulated conductors are formed into multiconductor wires or cables such as star quads.

The effect of this eccentricity of insulation has been found to be reduced when the insulated conductors are pretwisted about their own axes before they are stranded together into a quad or other multiconductor configuration. Pretwisting distributes the eccentricity of insulation into a helical pattern along the insulated conductor; and when the insulated conductors are placed adjacent to each other, they appear to be more nearly electrically equally spaced and less unbalance exists.

Simple pretwisting can achieve good electrical balance for conductors where the eccentricity is minimal; however, in most commercially manufactured wire, it is difficult and often uneconomical to provide minimal eccentricity. On the other hand, eccentricity may often be quite severe. In these cases, it is important to provide a pretwisting pattern which will not allow the thin and thick areas of adjacent conductors to come in contact with any regularity or periodicity.

While it is important to control electrical unbalance, it is still a prime consideration in manufacturing station wire to make the wire at as low a cost as possible. In the past, the pretwisting of insulated conductors of station wire has added considerably to the cost of station wire because reels of wire had to be specially handled and often separate operations were required to be performed on the wires to accomplish the pretwisting.

SUMMARY OF THE INVENTION

It is an object of the present invention to provide new and improved methods of and apparatus for improving the electrical characteristics of individually insulated multiconductor wires and cables.

It is another object of the invention to provide methods of and apparatus for improving the electrical balance between conductors in circuits of a telephone station wire in order to control the effect of currents which the circuits induce on each other and to accomplish this control of electrical balance by pretwisting each conductor about its own axis in such a way that the probability of periodic or regular matching of eccentricity of insulated conductors is reduced.

It is a further object of the invention to provide new and improved methods and apparatus in which individually insulated, untwisted conductors can be supplied, pretwisted and stranded together in a simultaneous operation.

A further object of the invention is the provision of a twisting type supply stand which can be loaded with reels from floor level without the need for auxiliary lifting or conveying devices.

A still further object of the invention is the provision of a system for controlling the tension in each separate insulated conductor being supplied to a strander by means of a variable torque brake which is controlled through a centrifugally loaded reel-diameter sensing bar.

An apparatus for making multiconductor electrical transmission media having improved electrical characteristics embodying certain features of the invention may include means for supplying a plurality of untwisted, individually insulated conductors, the insulated conductors each including a conductive core onto which insulating material has been eccentrically applied, means for twisting at least two of the insulated conductors about their own axes with different lengths of pitch and means for stranding the insulated conductors into a multiconductor transmission medium so that at least two adjacent conductors have different lengths of twist.

A method of making multiconductor electrical transmission media having improved electrical characteristics embodying certain features of the invention may include supplying the insulated conductors having eccentrically applied insulating material thereon, disposing the eccentricity of the insulating material of at least two of the conductors spirally about their associated conductive cores with a pattern of spiral disposition of the eccentricity of the insulating material of one of the conductors being different from the pattern of spiral disposition of the eccentricity of the insulating material of at least one of the adjacent insulated conductors, and stranding the insulated conductors into a multiconductor electrical transmission medium with at least two of the conductors having different spiral patterns of insulating material formed thereon being adjacent to each other.

BRIEF DESCRIPTION OF THE DRAWINGS

Other objects and features of the present invention will be more readily understood from the following detailed description of specified embodiments thereof when read in conjunction with accompanying drawings in which:

FIGS. 2A, B and C depict sectional views through a stranded wire product of the prior art in which the individual insulated conductors are twisted about their own axes with an equal twist length; the views being taken at various lengths along the stranded wire product so that the distance between FIG. 2A and FIG. 2B is an even multiple of the stranding lay length and a half multiple of the twist length of the insulated conductors, and the distance between FIGS. 2A and 2C is an even multiple of the stranding lay length and an even multiple of the twist length of the insulated conductors;

DETAILED DESCRIPTION

Figure 1A:
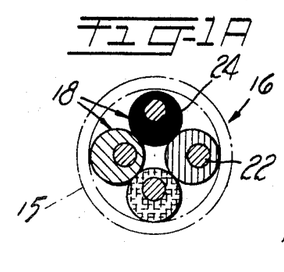
FIGS. 1A, B and C depict sectional views through a stranded and jacketed wire product of the prior art in which individual insulated conductors are not twisted about their own axes; the views being taken at various lengths along the stranded wire product and the distances between FIGS. 1A, 1B and 1C being even multiples of the stranding lay length of the stranded wire product.
Figure 1B:
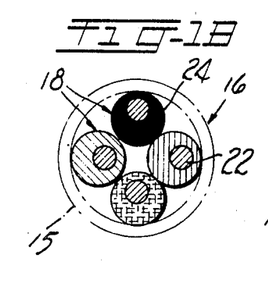
Figure 1C:
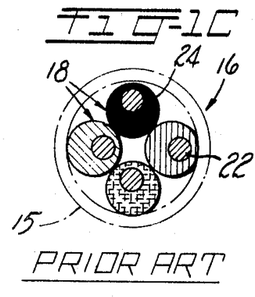
Figure 2A:
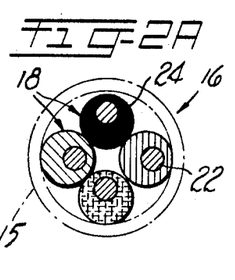
Figure 2B:
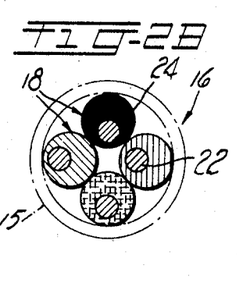
Figure 2C:
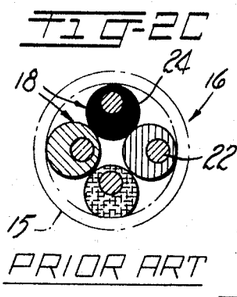
Figure 3A:
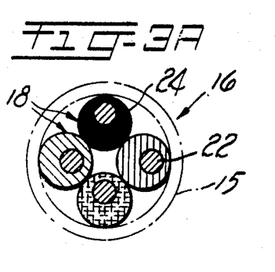
FIGS. 3A, B and C depict sectional views through the stranded wire product embodying certain principles of the present invention in which each of the individual insulated conductors is twisted about its own axis with a different length of twist; the views being taken at various lengths along the stranded wire product so that the distance between FIGS. 3A, 3B and 3C is an even multiple of the stranding lay length; but, because of the unique twist imparted to each of the insulated conductors, the distance is not a multiple of the length of twist of the insulated conductors.
Figure 3B:
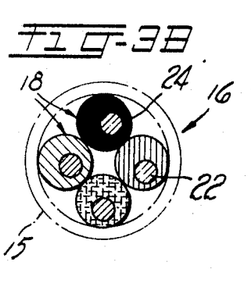
Figure 3C:
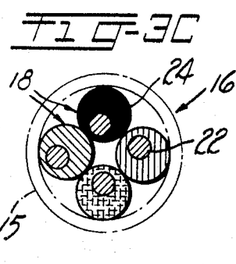

Referring now to the drawings and more particularly to FIGS. 1, 2 and 3 thereof, there are shown sections through a jacketed, stranded wire product, designated generally by the numeral 16, in which an extruded jacket 15 thereof is illustrated in phantom for purposes of simplicity. The jacket 15 is extruded in the manner described in a pending application, Ser. No. 613,188, filed on Feb. 1, 1967 in the names of N. J. Cogelia, S. M. Martin and R. B. Ramsey. Insulated conductors, designated generally by the numerals 18—18, are arranged in a formation which is often referred to as a star quad.

In all of the sectional views, each of the insulated conductors 18—18 includes a conductive core 22 and an insulating coating 24 applied eccentrically thereon. The insulating coating 24 of each of the insulated conductors 18—18 is a different color. The colors used in the illustration are black, green, yellow and red and are typical of those used in the telephone industry on station wire.

Looking now to the configuration in which the insulated conductors 18—18 are untwisted as shown in FIGS. 1A, B and C, one can see that the spacing between the conductive cores 22—22 of the yellow insulated conductor and the red insulated conductor is different from the spacing between the conductive cores of the green insulated conductor and the red insulated conductor. The red and green insulated conductors 18—18 are components of one paired circuit and the black and yellow insulated conductors are components of another paired circuit within the stranded wire product 16.

When none of the insulated conductors 18—18 are twisted about their own axes, it can be seen that a constant inequality in spacing can exist throughout the length of the stranded wire product 16. Even though successive portions of each of the insulated conductors 18—18 change their orientation with respect to general space along the length of the stranded wire product 16, the orientation of any of the insulated conductors within the stranded wire product does not change with respect to any of the other insulated conductors within the stranded wire product. Due to the fact that there can develop a constant inequality in the spacing between the conductive cores 22—22 of a disturbed and a disturbing pair in the untwisted configuration, there is a high probability that crosstalk and noise will develop because of the ensuing electrical unbalance caused by the inequality in spacing.

Looking now to FIGS. 2A, B and C, one can see that some improvement over the untwisted configuration can be obtained by twisting each of the insulated conductors 18—18 about its own axis. FIG. 2A again shows conductive cores 22—22 on which eccentric insulative coatings 24—24 have been applied. Again, there may develop an inequality in spacing between the conductive cores 22—22 of a disturbed and a disturbing pair, but FIG. 2B shows that when the insulated conductors 18—18 are twisted about their own axes their orientation with respect to each other may change as well as their orientation with respect to general space. In other words, the inequality in the spacing between the green and yellow conductors 18—18 and the red and yellow conductors as shown in FIG. 2B is not necessarily the same as it was in FIG. 2A, and it can be readily seen that this changing of orientation of insulated conductors 18—18 with respect to each other produces statistically a situation wherein the subject spaces approach electrical equality.

FIG. 2C shows a point which is one twist pitch length of the insulated conductors 18—18 away from FIG. 2A. It can be seen by comparing FIGS. 2C and 2A that the orientation of the insulated conductors 18—18 with respect to each other will probably be the same; and therefore, the inequality in spacing will probably be the same. Thus, there may very well exist a situation where an inequality in spacing occurs on a repetitive or periodic basis; and this recurring inequality in spacing would be likely to adversely affect the statistical electrical equalization of spacing between the conductive cores 22—22 achieved by pretwisting.

However, in accordance with the present invention, this condition can be improved if the twist lengths of all four insulated conductors 18—18 are not the same. In FIGS. 3A, 3B and 3C, there is illustrated a case in which all four of the insulated conductors 18—18 have been twisted about their own axes with different twist lengths. FIGS. 3A, 3B and 3C all show unique spacings of the conductive cores 22—22. In this case, it is improbable statistically that a situation where repetitive inequalities in spacing will occur; and therefore, statistically, the probability for eliminating electrical unbalance is extremely high.

The foregoing discussion has pointed out the advantages of the improved twisting technique on the reduction of crosstalk and noise in a stranded wire product 16. It is also important to note that the equalization of spacing between the conductive cores 22—22, which develops statistically, is advantageous to control uniformity in the capacitance which develops between the conductive cores of any particular paired circuit. This controlling of uniformity in capacitance in a paired circuit has a direct effect on the control of impedance of that circuit and, consequently, its efficiency in transmitting high frequency signals.

In cases where the stranded wire product 16 might be enclosed in a grounded shield (not shown), the capacitance which would develop between the conductive cores 22—22 and the shield should be kept uniform in order to make the electrical interaction between conductive cores and the shield predictable. The unmatched twisting of the insulated conductors 18—18 would help equalize the spacing which would develop between the conductive cores 22—22 and the shield (not shown) and would thus contribute to uniformity of capacitance. The level of noise or crosstalk induced into the conductive cores 22—22 of a paired circuit by the shield would be made minimal when the capacitance between these elements became uniform.

Predictability of the capacitance which will develop between two of the conductive cores 22—22 used as a paired circuit or between one of the conductive cores and the shield (not shown) which might be used is important because station apparatus can be better designed when parameters such as the subject capacitances can be relied upon by a designer to have definite values.

Methods and apparatus described below are capable of being used to provide a stranded wire product 16, which has insulated conductors 18—18 with an unmatched twist.

Figures 4, 5:
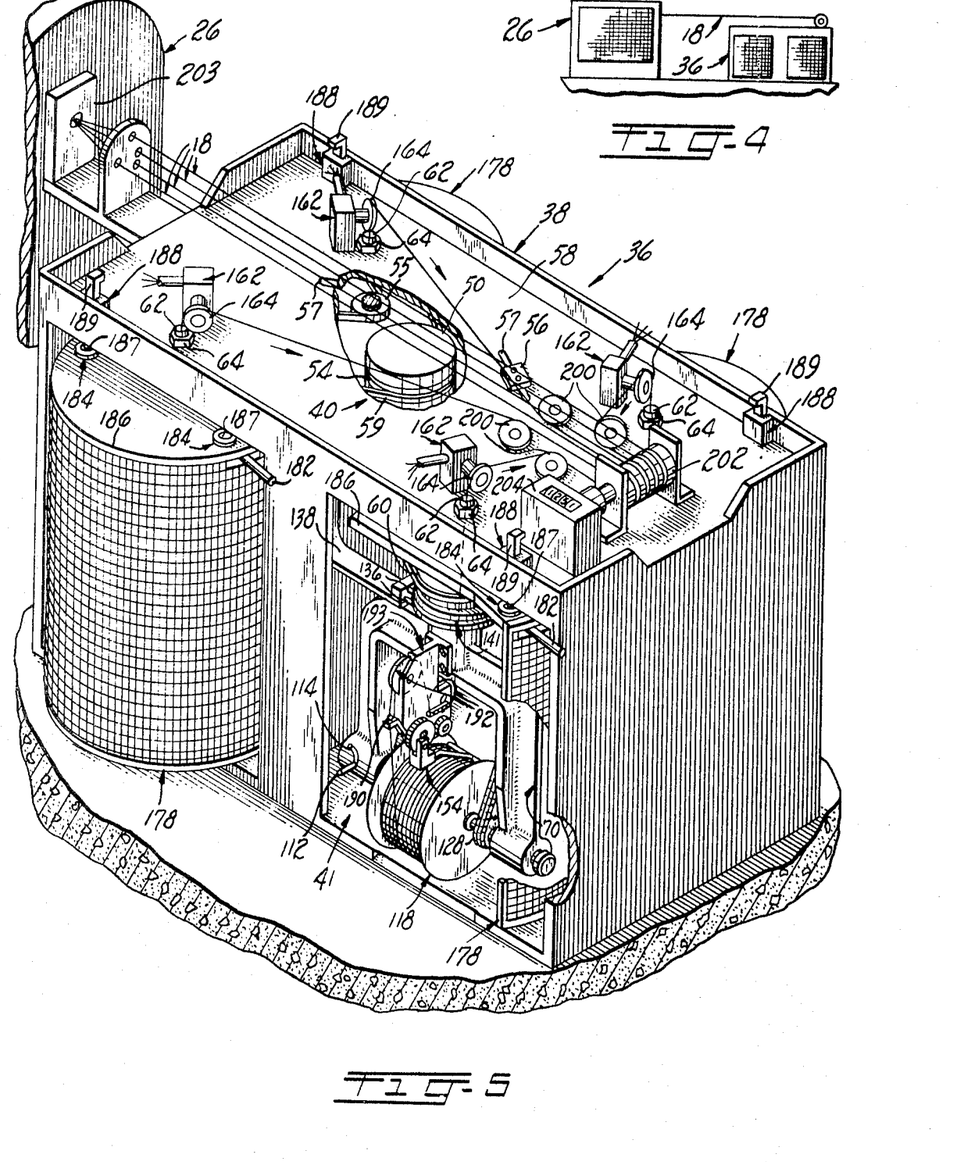
FIG. 4 is a schematic elevational view of a strander and a novel twisting apparatus arranged in a manner used to manufacture an improved stranded wire product.
FIG. 5 is an isometric view of the twisting apparatus of FIG. 4 embodying certain principles of the present invention with portions thereof broken away for purposes of clarity.

Referring now to FIG. 4, there is shown a conventional flyer strander, designated generally by the numeral 26, and a twister, designated generally by the numeral 36. An example of a type of machine which might be used as the strander 26 is disclosed in United States Patent 2,899,142 issued to Tillman T. Bunch on Aug. 11, 1959.

Figure 12:
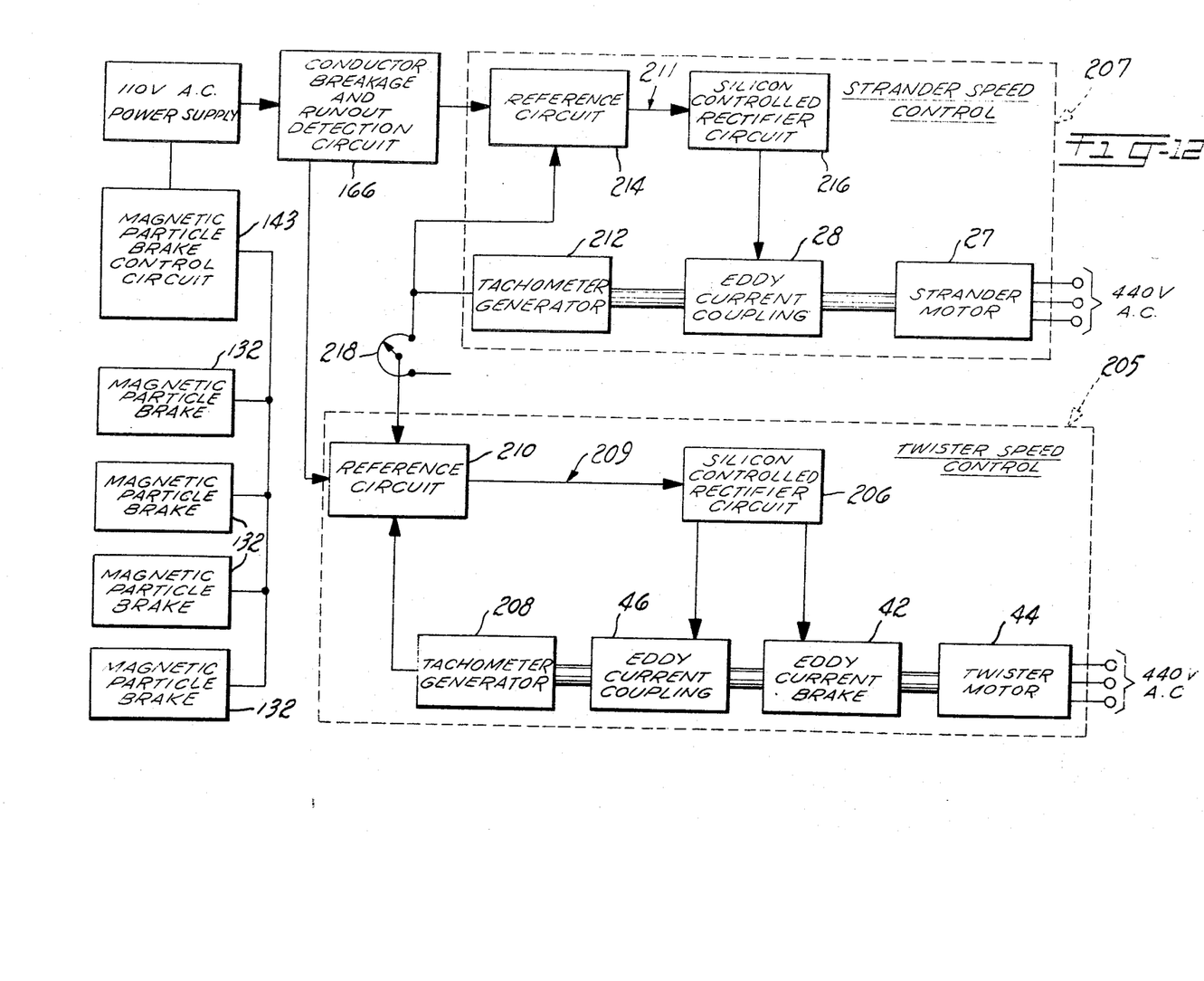
FIG. 12 is a schematic diagram of an electrical control circuit for the apparatus of FIG. 4.

The insulated conductors 18—18 are pulled into the strander 26, around various guide sheaves (not shown) and onto a flyer bow (not shown). The flyer bow is driven rotatably about a takeup reel (not shown) thereby imparting the stranded configuration to the insulated conductors 18—18. The takeup reel is driven rotatably about its axis and this rotation provides the force necessary to pull the insulated conductors 18—18 through the entire twisting and stranding operation. Proper distribution of the stranded wire product 16 on the takeup reel is accomplished by reciprocally traversing the reel along its axis. The over-all driving force for the strander 26 is provided by a strander motor 27 (FIG. 12) and an eddy-current coupling 28 (FIG. 12).

Figure 6:
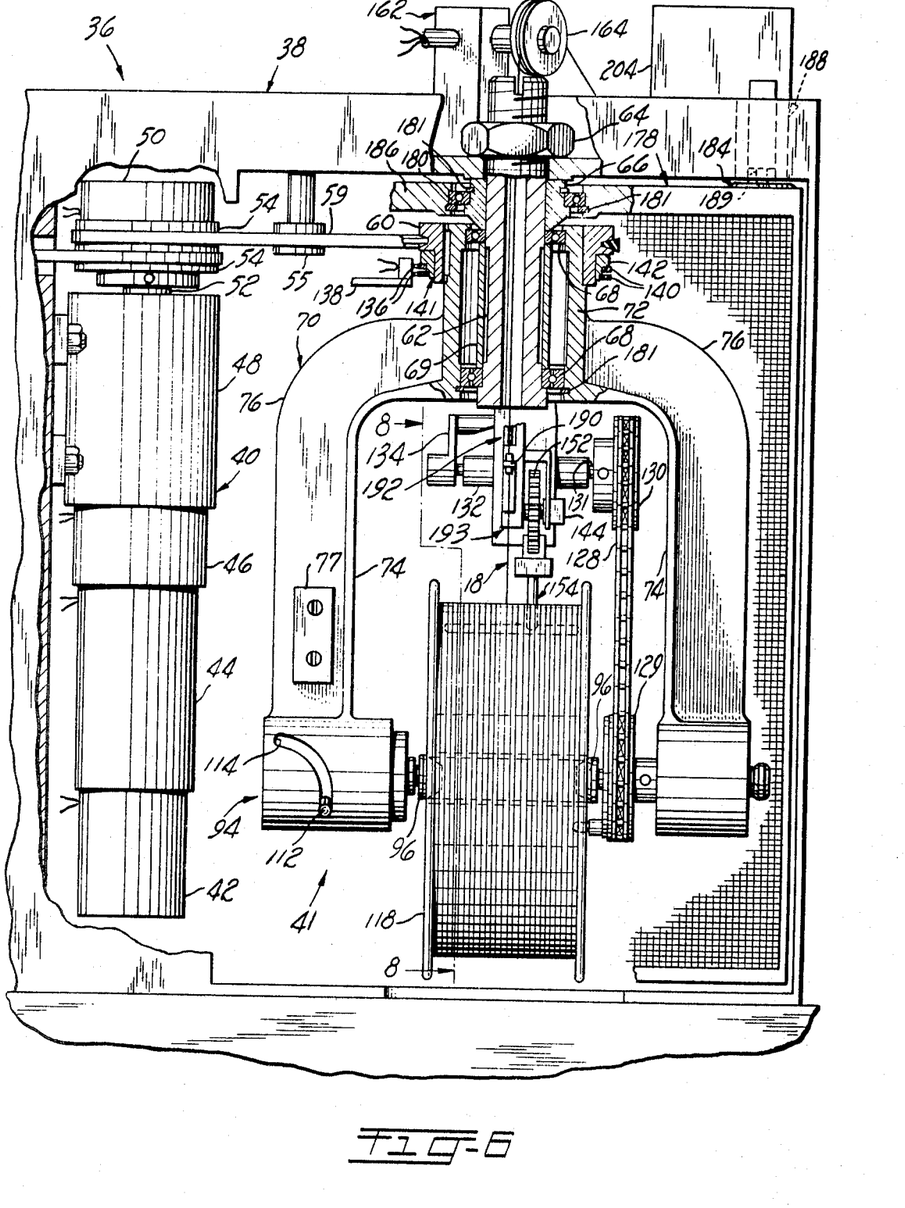
FIG. 6 is an enlarged, partially sectioned front elevational view of a portion of the apparatus of FIG. 5 with various portions thereof broken away for purposes of clarity.

Referring now to FIGS. 5 and 6, there is shown the twister 36 wherein twisting of the individual insulated conductors 18—18 is accomplished. The twister 36 includes a welded, rectangular housing forming a main frame, designated generally by the numeral 38, a main twister drive unit, designated generally by the numeral 40 (FIG. 6), and four, rotatably driven, vertically oriented, yoke assemblies, designated generally by the numerals 41—41.

Figure 7:
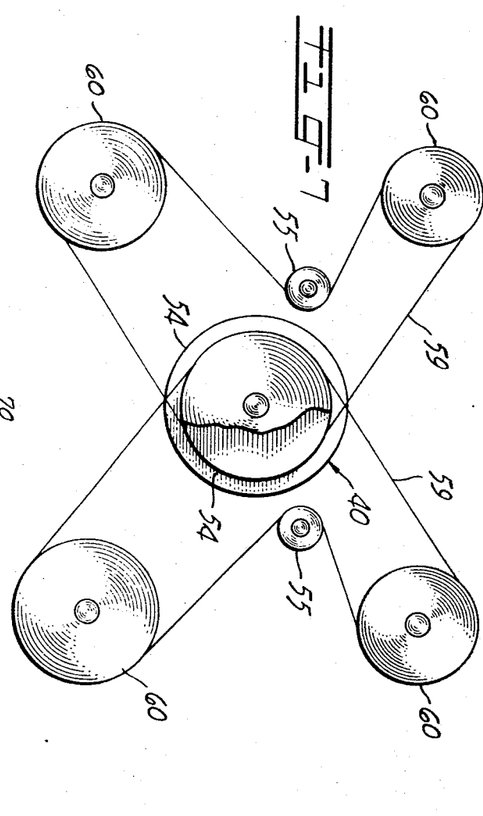
FIG. 7 is a schematic illustration of the mechanical elements of a drive system used in the apparatus of FIG. 5.

The main twister drive unit 40 includes an eddy-current brake 42, a twister motor 44, an eddy-current coupling 46 and a gear box 48. All the aforementioned components of the main twister drive unit 40 are arranged coaxially of each other. Two driving V-belt pulleys 54—54 (FIGS. 5, 6 and 7) are mounted on a shaft 52, extending from the gear box 48. The pulleys 54—54 are connected to a conventional electromagnetic clutch 50 which can be disengaged to allow the yoke assemblies 41—41 to be rotated manually during a loading operation. There are two adjustable idler pulleys 55—55 secured to mounting plates 56—56, only one of which is shown in FIG. 5. The mounting plates 56—56 cooperate with slotted apertures 57—57 cut into the top 58 of the main frame 38 to provide an adjustable mounting arrangement for the pulleys 55—55. Two V-belts 59—59 are used to transmit power from the driving V-belt pulleys 54—54 to the rotatable yoke assemblies 41—41. Each V-belt 59 connects one of the driving V-belt pulleys 54—54 to two of the yoke assemblies 41—41. One of the adjustable idler pulleys 55—55 is used to maintain proper tension in each of the V-belts 59—59.

A driven V-belt pulley 60 (FIGS. 5, 6 and 7) is mounted on each of the yoke assemblies 41—41. Each of the four driven V-belt pulleys 60—60 has a pitch diameter which is different from the pitch diameter of any of the other three driven V-belt pulleys 60—60 (see FIG. 7). Since all four driven V-belt pulleys 60—60 have a different pitch diameter, the angular velocity of each of the four yoke assemblies 41—41 will be different than the angular velocity of any of the remaining three yoke assemblies. This difference in angular velocity provides the desired variation in twist length imparted to the individual insulated conductors 18—18.

The yoke assemblies 41—41 are mounted rotatably to the main frame 38 in the manner shown in FIG. 6. A threaded, apertured, support mandrel 62 is held in place within the top 58 of the main frame 38 with a self-locking nut 64. Mounted on the support mandrel 62 is a guard-supporting spacer 66 and two yoke-supporting bearings 68—68. The bearings 68—68 are held in position with a bearing spacer 69. Mounted on the yoke-supporting bearings 68—68 is a cast steel yoke, designated generally by the numeral 70, which is provided with a shank 72, two arms 74—74 and a stiffening web 76 on each of the arms. Each of the yoke assemblies 41—41 is balanced before assembly in the twister with a suitably sized balancing weight 77 which is screwed in place thereon. The driven V-belt pulleys 60—60 are mounted on and keyed directly to the shanks 72—72 of the yokes 70—70.

At the lower ends of the arms 74—74, there are mounted components of a reel-lifting and locking assembly, designated generally by the numeral 94, which is constructed similarly to and functions in substantially the manner as those disclosed in United States Patent 2,332,005 issued to Axel C. Nystrom and Lester O. Reichelt on Oct. 19, 1943. The reel-lifting and locking assembly 94 includes two rotatably supported, frustoconically ended, reel-lifting and support pintles 96—96. One of the reel-lifting and support pintles 96 is mounted in each of the arms 74—74.

Figures 9, 10:
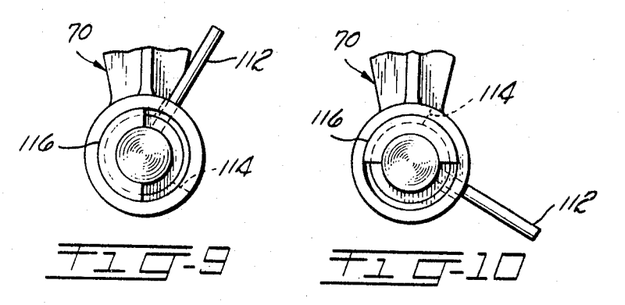
FIGS. 9 and 10 are elevational views of a counterbalance arrangement used on a reel lifting and locking assembly of the apparatus of FIGS. 5 and 6 with an operating handle and counterbalance thereof in different operating positions.

Referring now to FIG. 9, in more conventional reel supporting systems, a cam slot 114 (FIG. 6) would be cut in such a way that a lever 112 could travel beyond a vertical plane containing the longitudinal axis of the reel-lifting and support pintles 96—96. This overtravel of the lever 112 would provide for a resting position in which gravitational forces would operate on the lever to hold the reel-lifting and locking assembly 94 in its open position. However, the present design of the twister 36 is intended to be as compact as possible. In order to meet this requirement for compact design, and still provide the yokes 70—70 (FIG. 6) with a design which can withstand the stresses developed during the rotation of the yokes, it is desirable to form the stiffening web 76 (FIG. 6) in such a way that the lever 112 cannot overtravel the vertical plane containing the longitudinal axis of the reel-lifting and support pintle 96. In order to hold the lever 112 in its nearly vertical position when the reel-lifting and locking assembly 94 is open, as illustrated in FIG. 9, the reel-lifting and locking assembly 94 has been provided with a semitoroidal counterweight 116. As illustrated in FIG. 10, after the lever 112 is rotated downwardly to a position which results in the closing of the reel-lifting and locking assembly 94, the counterweight 116 is in a neutral position and exerts no rotative force tending to open the reel-lifting and locking assembly 94.

Figure 8:
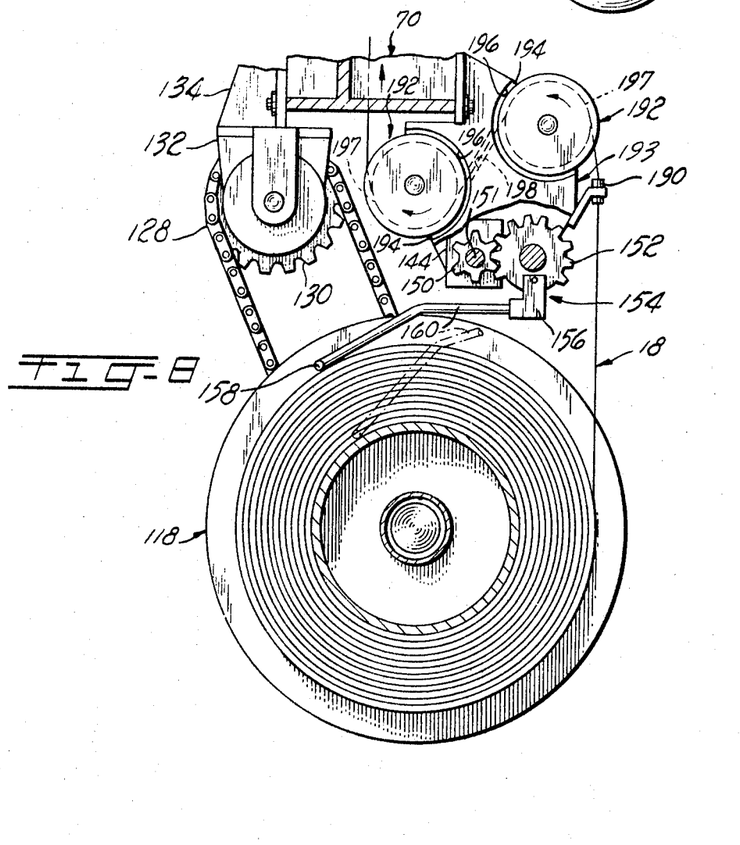
FIG. 8 is a fragmentary sectional view of a wire tension control system taken substantially along the line 8—8 of FIG. 6.

Referring now to FIGS. 6 and 8, a chain 128 is used to transmit force between a sprocket 129 mounted on one of the reel-lifting and support pintles 96—96 and a sprocket 130. The sprocket 130 is mounted on a shaft 131 extending from a conventional magnetic-particle brake 132 which magnetic-particle brake is used to provide tension on successive portions of the insulated conductor 18 as they are pulled from a reel, designated generally by the numeral 118. The magnetic-particle brake 132 is attached rigidly to the yoke 70 by means of an adapter 134.

Electrical energy needed to control and actuate the magnetic-particle brake 132 is conducted through a set of two brushes 136—136 mounted on a brush supporting arm 138. The brushes 136—136 bear against two contact rings 140—140 of a contact ring assembly, designated generally by the numeral 141. The contact rings 140—140 are mounted on an insulating ring 142. The current to the magnetic particle brake 132 is supplied through a magnetic particle brake control circuit 143 (FIG. 12). The current is determinative of the torque which the magnetic particle brake 132 is capable of restraining.

The control of current supplied to the magnetic particle brake 132 during the normal running of the twister 36 is accomplished by varying the resistance of a potentiometer 144 (FIGS. 6 and 8). The potentiometer 144 is mounted rigidly to the yoke 70. The potentiometer 144 has a gear 150 mounted on an extending shaft 151. The gear 150 meshes with and is driven by a controller gear 152. Although for purposes of simplicity it is not so illustrated in FIG. 8, the gear ratio existing between the gear 150 and the controller gear 152 is sufficient to translate the limited rotation of the controller gear into substantial rotary motion of the gear 150, thus providing a considerable range of control on the potentiometer 144.

The controller gear 152 has mounted on it, eccentrically of its axis, a reel-diameter sensing arm, designated generally by the numeral 154. The reel-diameter sensing arm 154 includes a weight 156, a cylindrical reel-contacting rod 158 and a connecting link 160. The reel-contacting rod 158 spans substantially the entire width of the reel 118. The connecting link 160 is a bent cylindrical bar which is welded on one end to the reel-contacting rod 158. The other end of the connecting link 160 is secured to the weight 156. The shaping of the connecting link 160 combined with the location of the pivot point of the reel-diameter sensing arm 154, which pivot point coincides with the axis of rotation of the controller gear 152, provides a situation in which the weight 156 operates to hold the reel-contacting rod 158 against convolutions of the insulated conductor 18 on the reel 118 during rotation of the yoke assembly 41. As can be seen in FIG. 8, the pivot point of the reel-diameter sensing arm 154 is on the opposite side of the axis of rotation of the yoke assembly 41 from the reel-contacting rod 158. Thus, when rotation of the yoke assembly 41 takes place, centrifugal force operates on the weight 156 of the reel-diameter sensing arm 154. The centrifugal force so created causes a rotative force to operate on the reel-diameter sensing arm 154 and the controller gear 152. The existence of this force causes the reel-contacting rod 158 of the reel-diameter sensing arm 154 to be held firmly in contact with the convolutions of insulated conductor 18 on the reel 118.

The mass of the weight 156 of the reel-diameter sensing arm 154 is not so great, however, as to overcome the gravitational force which develops on the reel-contacting rod 158 and the connecting link 160 of the reel-diameter sensing arm and holds the rod 58 against the reel 118 when there is no rotation of the yoke assembly 41. In other words, the reel-diameter sensing arm 154 is constructed and mounted in such a way that it maintains contact with the convolutions of insulated conductor 18 on the reel 118 in cases where the yoke assembly 41 is either rotating or stationary.

The shape and position of the reel-diameter sensing arm 154 also facilitates loading of the reels 118—118 into the yoke assemblies 41—41. When the reels 118—118 are rolled into position between the reel-lifting and support pintles 96—96, the convolutions of insulated conductor 18 on the reels push the reel-diameter sensing arm 154 into its operating position without any necessity for the operator to support manually the reel-diameter sensing arm or move it out of the way.

During any period of time when the twister 36 is decelerating because of its being stopped, the current for the magnetic particle brakes 132—132 is supplied through the magnetic particle brake control circuit 143 (FIG. 12) independently of the control of the potentiometers 144—144. The current supplied during the deceleration period is adjustable manually and since the rotating mass of the reel 118 is being stopped, the current required is substantially greater than the current which is supplied to the magnetic particle brakes 132—132 during normal running conditions.

Referring now to FIG. 5, there are four conventional zero-speed switches, designated generally by the numeral 162—162, mounted on the top of the main frame 38. Each of the zero-speed switches 162—162 is provided with a pulley 164 over which successive portions of the associated insulated conductor 18 passes. The zero-speed switches 162—162, are used to detect any lack of motion of the insulated conductor 18. If any of the pulleys 164—164 stop rotating, the associated zero-speed switch 162 will open a conductor-breakage and runout-detection circuit 166 (FIG. 12) which opened circuit will stop the strander 26 and twister 36.

A timed shunt (not shown) is provided within the conductor-breakage and runout-detection circuit 166 to hold the zero-speed switches 162—162 inoperative for a period of time sufficient to allow motion of the pulleys 164—164 to develop while the stranding and twisting operation is being started. After this inoperative period of time has elapsed, any subsequent lack of motion of the associated conductors 18—18 will be sensed by the zero-speed switches 162—162. The zero-speed switches 162—162 are also provided with selector shunts (not shown) incorporated in the conductor-breakage and runout-detection circuit 166 which selector shunts can be used to make any or all of the zero-speed switches inoperative during the normal stranding and twisting operation.

It is sometimes desirable to hold some of the zero-speed switches 162—162 inoperative so that the stranding and twisting operation can take place with something less than the full complement of the insulated conductors 18—18 being supplied from the yoke assemblies 41—41. One situation that develops which makes it desirable to hold one of the zero-speed switches 162—162 inoperative comes about when an alternate supply stand, designated generally by the numeral 170 (FIG. 11), is used.

Figure 11:
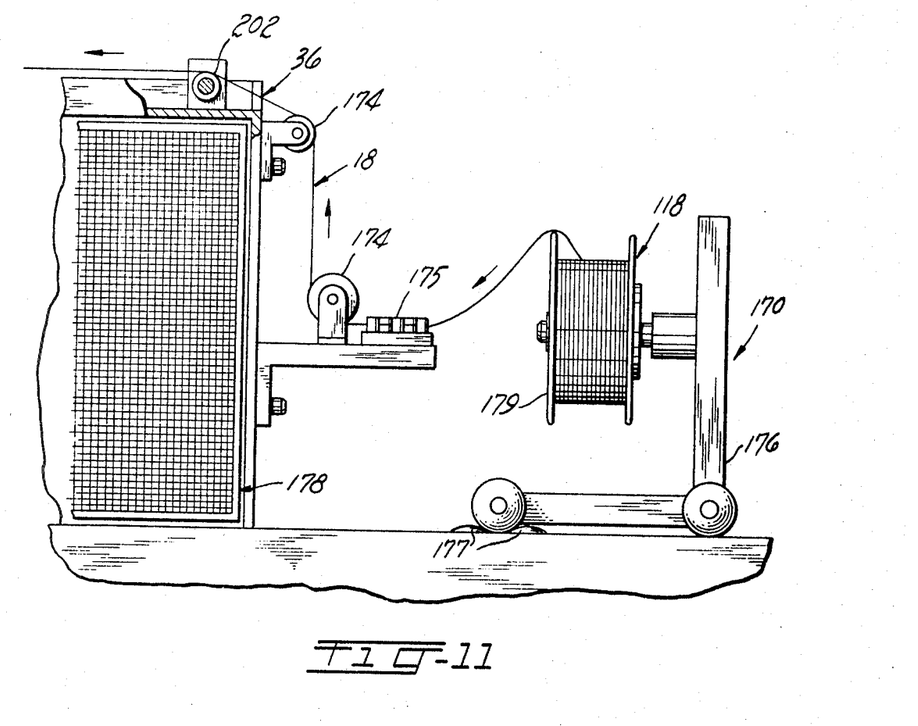
FIG. 11 is a front elevational view of an alternate supply stand shown in position behind the apparatus of FIG. 5.

When the alternate supply stand 170 is used, wire guides 174—174 are provided, a conventional wire straightener 175 is used as a wire tensioner 175, and a reel-support stand 176 is positioned over stops 177—177. The alternate supply stand 170 is used in cases where convolutions of the insulated conductor 18 are distributed poorly on the reel 118. When convolutions of the insulated conductor 18 are distributed poorly on one of the reels 118—118, revolution of the reel within a yoke assembly 41 might contribute to additional tangling and possible breakage of the insulated conductor as portions of the insulated conductor are pulled successively from the reel.

Use of the alternate supply stand 170 of the type shown allows successive portions of the insulated conductor 18 to be removed from the reel 118 by being pulled over a flange 179 of the reel. As successive portions of the insulated conductor 18 are pulled over the flange 179 of the reel 118, one twist is imparted to the insulated conductor for each convolution of the insulated conductor being removed from the reel. Since the length of the insulated conductor 18 which is contained in each convolution varies as the diameter of the convolution varies, it can be seen that as the diameter of the convolution decreases, a varying pitch twist is imparted to the insulated conductor 18 being supplied from the alternate supply stand 170. The eccentricity of the insulating coating 24 on one of the insulated conductors 18—18 twisted in this fashion relates statistically to the insulated conductors in much the same way as if it had been supplied from one of the rotating yoke assemblies 41—41 and will give a similar result.

Referring now to FIGS. 5 and 6, in order that the reels 118—118 can be loaded easily into the yoke assemblies 41—41, it is important that the yoke assemblies not be set very far back into the main frame 38. When the yoke assemblies 41—41 so mounted are rotated, various portions of the yoke assemblies traverse paths which are outside the bounds of the main frame 38. In order to provide for a safe work area near the rotating yoke assemblies 41—41, a guard, designated generally by the numeral 178, is provided around the rotational path of projecting portions of each of the rotating yoke assemblies. The guard 178 is formed of expanded steel rolled in a semicylindrical shape. The guard 178 is mounted pivotably on the guard-support spacer 66 (FIG. 6) by means of a guard-support bearing 180 which is held in place with conventional retaining rings 181—181.

When it is necessary to load one of the yoke assemblies 41—41 with one of the reels 118—118, the guard 178 can be pivoted into its open position. When the guard 178 is in its open position, it fits within the bounds of the main frame 38, and this arrangement allows for the use of a minimal amount of floor space for operating the twisters 36—36. A handle 182 is provided on the guard 178 for use in opening and closing the guard.

Two disc shaped, locking cams, designated generally by the numerals 184—184, are provided on a top 186 of each of the guards 178—178. The locking cams 184—184 are substantially frustoconical in shape. There is a cylindrical depression 187 formed centrally of the locking cam 184. When the locking cam 184 passes under and cooperates with a guard latch, designated generally by the numeral 188, a pawl 189 in the guard latch rides up on the conical surface of the locking cam; and as the motion of the locking cam continues, the pawl drops into place within the cylindrical depression 187 of the locking cam.

The guard 178 is held in an open position when the pawl 189 locks into the locking cam 184 nearest the handle 182. The guard 178 is held in a closed position when the pawl 189 locks in the locking cam 184 on the side of the top 186 opposite the handle 182.

Referring now to FIG. 8, as succesive portions of the insulated conductor 18 are pulled from the reel 118, they pass through a ceramic guide bushing 190, around two wire-guiding pulleys, designated generally by the numerals 192—192, and then upwardly through the apertured support mandrel 62 of the associated yoke assembly 41. The wire-guiding pulleys 192—192 are mounted rotatably in a wire-guiding shroud, designated generally by the numeral 193, which is, in turn, attached rigidly to the yoke 70. The wire-guiding shroud 193 is a steel casting into which there have been formed two depressions 194—194 which are shaped substantially like segments of a shallow cylinder. The wire-guiding pulleys 192—192 nest in these depressions 194—194 and walls 196—196 of the depressions act as wire restraints to help prevent the escape of wire from grooves 197—197 formed in the wire-guiding pulleys. There is a wire-guiding passage 198 formed between the two depressions 194—194. Successive portions of the insulated conductor 18 pass through the wire-guiding passage 198 as the successive portions of the insulated conductor progress from the outer wire-guiding pulley 192 to the inner wire-guiding pulley 192.

The arrangement of wire-guiding pulleys 192—192 in the wire-guiding shroud 193 is one which facilitates stringing up of the twister 36 by an operator. When a leading end of the insulated conductor 18 is held in the groove 197 of the outer wire-guiding pulley 192 while the outer wire-guiding pulley is stationary or is rotated manually by the operator, the end of the insulated conductor 18 is deflected by the wall 196 of the outer depression 194; and thus it progresses naturally around the outer wire-guiding pulley 192 and through the wire-guiding passage 198 where it is deflected by the wall 196 of the inner depression 194 and progresses around the inner wire-guiding pulley 192.

Referring now to FIG. 5, after successive portions of one of the insulated conductors 18—18 emerge from the associated apertured support mandrel 62, they pass around the pulley 164 of the associated zero-speed switch 162, around an associated fixed guide pulley 200, around a multigrooved counter pulley 202 and then through a wire convergence guide 203. The counter pulley 202 is used to drive a conventional footage counter 204. The use of the multigrooved counter pulley 202 distirbutes the force required to drive the footage counter 204 to all of the insulated conductors 18—18 which pass around the counter pulley, and thus helps to prevent uneven tensions from developing in the individal insulated conductors 18—18 as a result of driving the footage counter.

The footage counter 204 and the associated counter pulley 202 are positioned at the far end of the twister 36 from the strander 26 so that a relatively long unobstructed access to the insulated conductors 18—18 can be had. There are various advantages to having a long unobstructed access to the insulated conductors 18—18, which might include having space available to install a spark tester, a wire marker or any other convenient auxiliary device.

In order to provide the optimum operator visibility, the reels 118—118 of insulated conductor 18 are loaded into the twister 36 in such a way that the darkest colors are rotated at the slowest speed, and the brightest colors are rotated at the highest speeds. Conventional fluorescent lights (not shown) are provided within the main frame 38 near each of the yoke assemblies 41—41 to illuminate each of the rotating yoke assemblies and their associated reels 118—118. To further optimize visibility, the inside of the main frame 38 as well as the various components of the twister 36 which are inside the main frame are painted with a light color paint.

Referring now to FIG. 12, there is shown a system, designated generally by the numeral 205, for controlling the speed of the twister 36 and a system, designated generally by the numeral 207, for controlling the speed of the strander 26. The current supplied to the twister eddy-current coupling 46 of the main twister drive unit 40 is controlled by a silicon controlled rectifier circuit 206. A tachometer generator 208 is coupled mechanically to and rotates at the same rate of speed as the output speed of the eddy-current coupling 46. A voltage produced by the tachometer generator 208 is used as a feedback signal to a reference circuit 210. The reference circuit 210 utilizes the signal from the tachometer generator 208 to control the silicon controlled rectifier circuit 206, which in turn, of course, controls the current to the eddy-current coupling 46. A feedback loop, designated generally by the numeral 209, just described, operates to maintain the speed of the main twister drive unit 40 independently of the load applied to the main twister drive unit.

Referring now to the strander speed control system 207, a tachometer generator 212 is driven at the same speed as the output of the eddy-current coupling 28 used on the strander 26. The output voltage from the tachometer generator 212 is used in a feedback loop, designated generally by the numeral 211, to maintain the speed of the strander 26 independently of the load applied to the strander. A reference circuit 214 and a silicon controlled rectifier circuit 216 are provided in the strander speed control feedback loop 211.

The voltage supplied by the tachometer generator 212 is also used to signal the reference circuit 210, which ultimately controls the speed of the twister 36. The reference circuit 214 is provided with a conventional linear acceleration control system, which operates to regulate the acceleration of the strander 26 in a linear manner with respect to time when the strander is starting or stopping. The control path existing through the tachometer generator 212, the reference circuit 210 and the silicon controlled rectifier circuit 206 operates to keep the acceleration of the twister 36 synchronized with the acceleration of the strander 26. When the strander 26 and twister 36 are stopped, a linear deceleration of the strander and twister occurs.

The masses being rotated in the yoke assemblies 41—41 contribute significantly to the forces which must be overcome in order to decelerate the twister 36. It becomes desirable to provide the eddy-current brake 42, which is used on the main twister drive unit 40 (FIG. 6), with a controlled braking current, which current is controlled by the silicon controlled rectifier circuit 206 during the deceleration.

The speed of the twister 36 can be varied with respect to the speed of the strander 26, by means of a modulating potentiometer 218. The modulating potentiometer 218 operates on the reference circuit 210 to vary the control which the reference circuit has over the speed of the twister 36.

It is desirable to be able to vary the speed of the twister 36 with respect to the speed of the strander 26 because it is often necessary to strike a compromise between the more desirable electrical properties achieved by pretwisting the insulated conductors 18—18 at high speeds and the undesirable problems associated with high speed rotation of the yoke assemblies 41—41. Statistically, the degree to which the insulated conductors 18—18 are pretwisted has a positive effect on the statistical attainment of electrical balance in the stranded wire product 16. In other words, the insulated conductors 18—18 which have been pretwisted with a shorter pitch are more likely to provide electrically balanced circuits. However, twisting of the insulated conductors 18—18 with a short pitch results in high rotational velocities of the yoke assemblies 41—41 and consequently high centrifugal forces develop on convolutions of the insulated conductor on reels 118—118 which are being revolved with the yoke assemblies. These high centrifugal forces which operate on the convolutions of insulated conductor 18 tend to slide the convolutions across one another and thereby cause tangling of the insulated conductor on the associated reel 118. It can be seen then that the best compromise in the speed of the twister 36 is attained when a satisfactory electrically balanced circuit can be made in the stranded wire product 16 without undue breakage of the insulated conductor 18 due to tangling.

An example of a specific embodiment of the stranded wire product 16 and the one illustrated in FIGS. 3A, B and C is a star quadded telephone station wire in which the stranding lay is four inches and the individual insulated conductors 18—18 are twisted about their own axes with pitches of 38 inches, 41 inches, 45 inches and 48 inches, respectively.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method for making an improved multiconductor electrical transmission medium from a plurality of individually insulated conductors having insulating material formed eccentrically about conductive cores thereof, which comprises:

supplying the insulated conductors having eccentrically applied insulating material thereon,     disposing the eccentricity of the insulating material of at least two of the conductors spirally about their associated conductive cores with a pattern of spiral disposition of the eccentricity of the insulating material of one of the conductors being different from the pattern of spiral disposition of the eccentricity of the insulating material of at least one of the adjacent insulated conductors, and stranding the insulated conductors into a multiconductor electrical transmission medium with at least two of the conductors having different patterns of spiral disposition of the insulating material formed thereon being adjacent to each other.

2. The method of claim 1, wherein the disposing of eccentricity of the insulating material of the conductors spirally about their associated conductive cores is accomplished by twisting the individual insulated conductors individually about their own axes with different lengths of twist.

3. An apparatus for making an improved multiconductor electrical transmission medium from a plurality of individually insulated conductors having insulating material formed eccentrically about conductive cores thereof, which comprises:

means for supplying insulated conductors having eccentrically applied insulating material thereon and for disposing the eccentricity of the insulating material of at least two of the conductors spirally about their associated conductive cores with a pattern of spiral disposition of the eccentricity of the insulating material of one of the conductors being different from the pattern of spiral disposition of the eccentricity of the insulating material of at least one of the adjacent insulated conductors, means for stranding the insulated conductors into a multiconductor electrical transmission medium with at least two of the conductors having different patterns of spiral disposition of insulating material being adjacent to each other, and means for supporting said means for supplying the insulated conductors and said means for stranding the insulated conductors in the proper positions for co-operative relationship.

4. The apparatus of claim 3, wherein the means for supplying the insulated conductors and for disposing the eccentricity of the insulating material of the conductors spirally about their associated conductive cores includes a twisting device which twists the individual insulated conductors individually about their own axes with different lengths of twist.

5. The apparatus of claim 4, wherein the means for twisting the individual insulated conductors includes revolvable reels.

6. The apparatus of claim 5, wherein the means for twisting the individual conductors includes revolvable, vertically oriented, open-ended yokes for supporting the revolvable reels.

7. The apparatus of claim 6, wherein the open ends of the yokes depend downwardly.

8. The apparatus of claim 7, wherein each of the yokes is provided with two arms and each arm is provided with a rotatable reel-lifting and support pintle, at least one of the reel-lifting and support pintles associated with each yoke being longitudinally movable.

9. The apparatus of claim 8, which includes:

means for moving each of the longitudinally movable reel-lifting and support pintles manually, the means for moving the longitudinally movable reel-lifting and support pintles including laterally-projecting handles oscillatable about the central axes of the associated pintles and cams for translating oscillatory motion of the handles about the central axes of the associated pintles to longitudinal motion thereof, and means for counterweighting the handles, the center of inertia of each of the counterweighting means associated with each handle being displaced from a vertical plane containing the axis of oscillation of the associated handle when the associated longitudinally movable reel-lifting and support pintle is in a withdrawn position with respect to the associated reel, each of said counterweighting means having sufficient mass and displacement to maintain the associated handle in a substantially vertical position when the associated longitudinally movable reel-lifting and support pintle is in a withdrawn position with respect to the associated reel, the center of inertia of each of the counterweighting means being substantially aligned with the vertical plane containing the axis of revolution of the associated handle, said alignment being sufficient to substantially preclude the exertion of forces tending to open the associated longitudinally movable reel-lifting and support pintle when the associated longitudinally movable reel-lifting and support pintle is in a reel supporting position.

10. The apparatus of claim 5 which includes conductor tensioning means having at least portions of which are associated with each of the reels and revolve therewith, for controlling the tension in successive sections of associated insulated conductors, the means for controlling the tension in successive sections of the associated insulated conductors comprising revolvable reel-diameter sensing means for sensing the effective diameters of each of the associated reels, the reel-diameter sensing means having reel-diameter sensing arms each of which includes a reel-contacting portion, each of said arms being mounted for oscillation about an oscillatory axis, the oscillatory axis of each of the reel-diameter sensing arms being located on the opposite side of the axis of revolution of the associated revolvable reel from the reel-contacting portion of the associated reel-diameter sensing arm, the center of inertia of each of the reel-diameter sensing arms being located within a space bounded on three sides by a horizontal plane containing the oscillatory axis of the reel-diameter sensing arm, a vertical plane containing the oscillatory axis of the reel-diameter sensing arm and a vertical plane parallel to the last-mentioned plane and intersecting the axis of revolution of the associated reel so that centrifugal forces developing on the reel-diameter sensing arms from the revolution thereof about the axes of revolution of the associated reels operate to cause the reel-contacting portions of the reel-diameter sensing arms to engage convolutions of the insulated conductors on the associated reels, and gravitational forces on the reel-diameter sensing arms cause the reel-contacting portions of the reel-diameter sensing arms to engage with the convolutions of the insulated conductors on the associated reels when the reels are in stationary positions in the apparatus.

11. The apparatus of claim 10 which includes means for threading and guiding successive sections of the insulated conductors around components of the conductor tensioning means, which comprises:

a plurality of grooved wire-guiding pulleys, and at least two wire-guiding shrouds, the shrouds having means for supporting the wire-guiding pulleys rotatably and coaxially within a plurality of segmental cylindrical depressions in the shrouds, the segmental cylindrical depressions having diameters exceeding the outside diameters of the associated wire-guiding pulleys mounted therein by an amount which is less than twice the diameter of the insulated conductors being guided therethrough and the segmental cylindrical depressions having depths sufficient to substantially shroud the grooves in the associated wire-guiding pulleys, each of said wire-guiding shrouds having formed therein a wire-guiding passage between adjacent depressions, each of said wire-guiding passages being substantially tangential to the bottoms of the grooves of the adjacent pulleys so that successive portions of the associated insulated conductor can pass from the groove of the adjacent wire-guiding pulleys on one side of the passage to the groove of the adjacent wire-guiding pulley on the other side of the passage during a stringing up operation.

References Cited

UNITED STATES PATENTS

| | | | |
|---|---|---|---|
| 244,426 | 7/1881 | Bell | 174—34 |
| 1,104,078 | 7/1914 | Smith | 57—55 |
| 2,060,162 | 11/1936 | Boe. | |
| 2,081,427 | 5/1937 | Firth et al. | 174—34 |
| 2,329,130 | 9/1943 | Nelson et al. | 57—71 |
| 2,697,867 | 12/1954 | Arman | 29—624 |
| 2,778,059 | 1/1957 | Henning et al. | 264—103 |
| 2,869,316 | 1/1959 | Lilly | 57—93 |
| 2,947,652 | 8/1960 | Burr. | |
| 2,960,816 | 11/1960 | Douchet | 57—16 |
| 3,392,433 | 7/1968 | Teraoka. | |

THOMAS H. EAGER, Primary Examiner

U.S. Cl. X.R.

29—203; 57—16, 55, 71; 174—34